July 5, 1938.  C. F. ROBBINS  2,122,539
INDICATING DEVICE
Filed Oct. 28, 1935  2 Sheets-Sheet 1
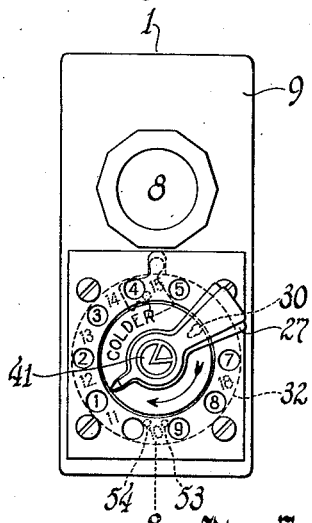
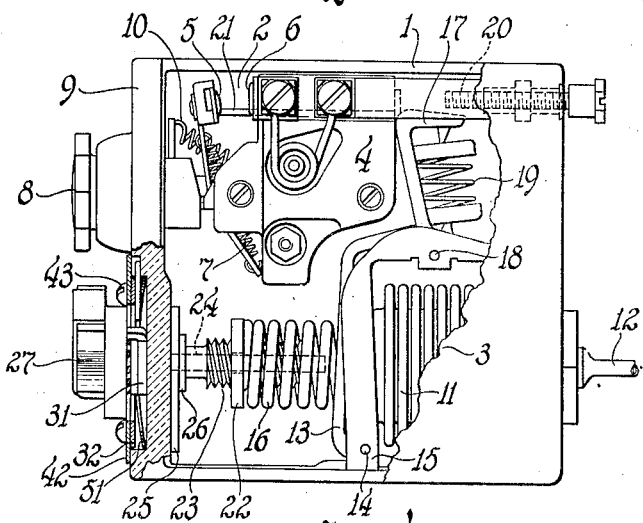
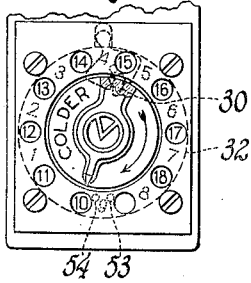
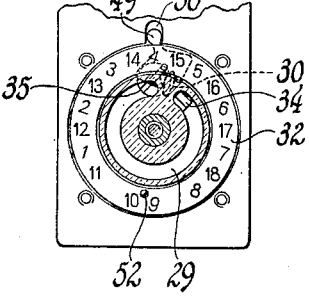
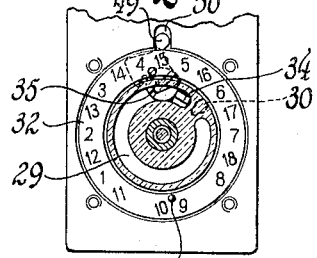
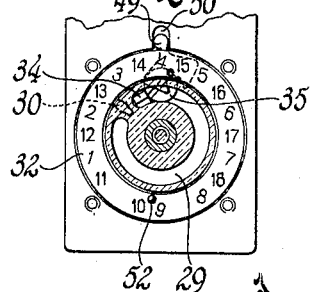
Inventor
Clyde F. Robbins
By Frank N. Hubbard
Attorney July 5, 1938.  C. F. ROBBINS  2,122,539
INDICATING DEVICE
Filed Oct. 28, 1935  2 Sheets-Sheet 2

Inventor
Clyde F. Robbins
By Frank H. Hubbard
Attorney

Patented July 5, 1938

2,122,539

UNITED STATES PATENT OFFICE 2,122,539

INDICATING DEVICE

Clyde F. Robbins, Milwaukee, Wis., assignor to Cutler-Hammer, Inc., Milwaukee, Wis., a corporation of Delaware Application October 28, 1935, Serial No. 47,017

13 Claims. (Cl. 200—83)

This invention relates to indicating devices, and while not limited thereto, more particularly relates to devices for indicating the setting of range adjusting mechanisms of electric refrigerator control devices.

Control devices for electric refrigerators are commonly provided with a loading spring for controlling the cycles of operation of the refrigerator. The loading spring is usually shop adjusted to provide predetermined normal cycles of operation of the refrigerator and is also usually provided with a range adjusting mechanism to enable the user to effect modification of such cycles. It is desirable that the range adjusting mechanism be operable to modify the cycles of operation so as to provide for operation of the refrigerator at various refrigerating temperatures and also at temperatures which are sufficiently high to effect defrosting. Also in order to facilitate indication of the setting of the range adjusting mechanism it is desirable that the same be provided with an adjusting knob or lever.

In some instances it has been found desirable to be able to effect adjustment of the loading spring to provide for operation of the refrigerator at refrigerating temperatures covering a relatively wide range, but the desired range of adjustment could not be obtained by a single revolution of the control knob without resort to a screw of objectionably great pitch. It is of course possible to effect adjustment of the loading spring through a wide range by providing for more than one revolution of the control knob, but heretofore no suitable or satisfactory means has been provided for indicating the setting of a range adjusting mechanism of such character.

The present invention has among its objects to provide an improved indicating device for control devices of the aforementioned character which provides for indication of the setting of the range adjusting mechanism in a manner to meet the aforementioned requirements.

Another and more specific object is to provide an indicating device which provides for accurate indication of the setting of adjusting mechanisms having a range of movement extending through more than one revolution of the control knob.

Another object is to provide an indicating device of the aforesaid character which is of simple and inexpensive construction.

Various other objects and advantages of the invention will hereinafter appear.

The accompanying drawings illustrate an embodiment of the invention which will now be described, it being understood that the embodiment illustrated may be modified in various respects without departing from the spirit and scope of the appended claims.

In the drawings, Figure 1 is a front elevational view of a refrigerator control device embodying the invention.

Fig. 2 is a side view of the control device shown in Fig. 1, a portion of the enclosing casing being broken away and another portion of the casing and certain elements of the indicating device being shown in section.

Fig. 3 is a fragmentary front elevational view of the device shown in Fig. 1.

Figs. 4, 5 and 6 are views similar to Fig. 3, the dial cover plate being removed and the control knob being shown in section.

Figure 7:
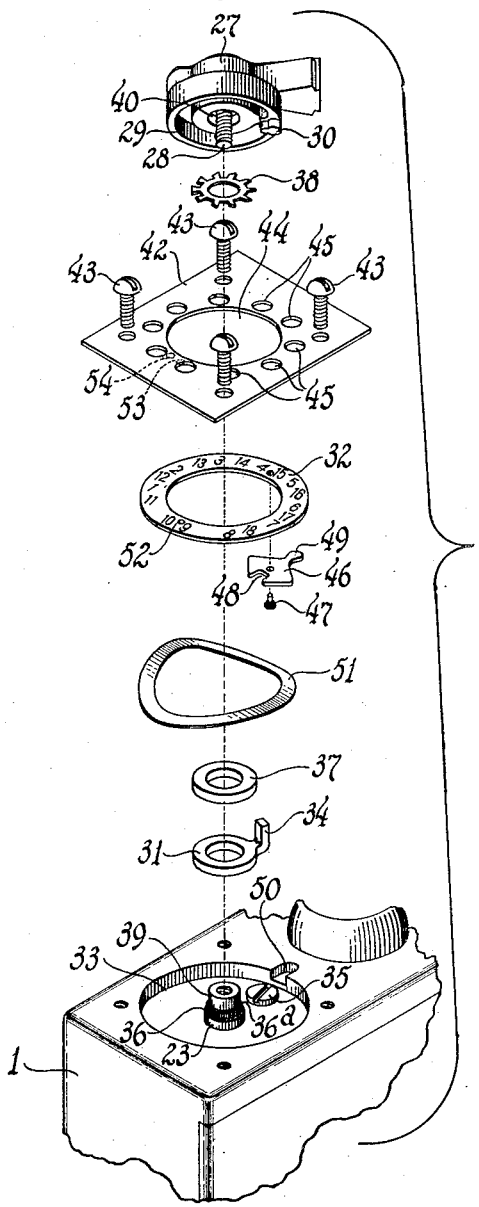
Fig. 7 is a perspective view, in separated relation, of the parts of the indicating device and of a fragment of the enclosing casing for the refrigerator control device.

Referring to Figs. 1 and 2, the invention is shown in connection with a refrigerator control device of the type shown in the co-pending application of Clarence W. Kuhn, Serial No. 708,804, filed January 29, 1934, but it may be used in connection with control devices of other types.

Briefly, the refrigerator control device shown in Figs. 1 and 2 includes a box-like enclosing casing I of insulation having a switch unit 2 and a fluid condition responsive device 3 mounted therein. Said switch unit includes an insulating base 4 which carries a pivoted bridging contact element 5 and a pair of cooperating stationary contacts, one of which is illustrated at 6. Contact element 5 is movable with a snap action into and out of engagement with its cooperating stationary contacts by an over-center spring 7, said spring being connected with and operated by a knob 8 slidably mounted within an opening in the front wall 9 of casing I. The switch unit 2 also has a free tripping overload mechanism associated therewith which acts under overload conditions to move contact element 5 into open position through the medium of a spring 10 and which mechanism is resettable by the knob 8, as described in the aforementioned Kuhn application. However, the overload mechanism per se forms no part of the present invention, and detailed description thereof herein is deemed unnecessary.

The fluid condition responsive device 3 includes a bellows 11 secured to the rear wall of casing I and having a communicating pipe extension 12 on the rear end thereof. The pipe 12 may be connected to the low pressure side of the refrigerator to provide for operation of the bellows by pressure in that part of the apparatus, or it may contain an expansible liquid or gas and have a portion thereof arranged at a point contiguous to the refrigerating apparatus where the temperature, and consequently the pressure within the pipe and bellows, varies in accordance with operations of the refrigerator.

The front end of bellows 11 bears against a vertically arranged lever 13, pivoted at 14, upon a bracket 15 fixed within the casing 1. A coil spring 16 engages lever 13 to oppose expansive movements of bellows 11 and said lever has a spring-toggle operating mechanism associated therewith for effecting snap movement of bridging contact 5 into and out of circuit closing position. Such operating mechanism includes a lever 17 pivoted at 18 upon bracket 15 and an overcenter spring 19 which is held under compression between the free ends of levers 13 and 17. Movement of lever 17 is limited in one direction by insulating base 4 and in an opposite direction by an adjustable stop 20 secured to the rear wall of casing 1, and said lever is arranged to operate the movable contact element 5 through the medium of an insulating bar 21 slidably mounted within a recess in insulating base 4.

Upon a decrease in temperature bellows 11 contracts under the action of spring 16. Upon attainment in the refrigerator of a given low temperature value determined by the setting of spring 16 lever 13 assumes a position wherein the axis of spring 19 is located to the right of pivot 18, whereupon lever 17 is adapted to move with a snap action into the position shown in Fig. 2 to effect opening of the bridging contact 5 against the action of spring 7. Upon an increase in temperature in the refrigerator, bellows 11 is expanded against the action of the spring 16 and for a given high temperature value, also determined by the setting of spring 16, lever 13 assumes a position wherein the axis of spring 19 is located to the left of pivot 18, whereupon lever 17 moves with a snap action out of the position shown in Fig. 2 into engagement with the stop 20 to permit reclosure of the contact element 5 under the action of spring 7. As will be understood, an adjustment of the degree of compression of spring 16 causes variation of the temperature values at which the contact element 5 is opened and closed, the temperature values at which said contact element is opened and closed being raised by increasing the degree of compression of said spring, and being lowered by decreasing the degree of compression thereof.

Figure 8:
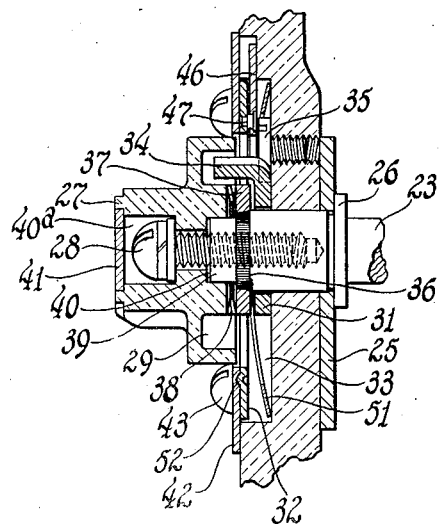
Fig. 8 is an enlarged fragmentary sectional view taken substantially on line 8 of Fig. 1.

Spring 16 is held under compression between lever 13 and an internally threaded nut 22, which is adjustably mounted upon a threaded shaft 23. Nut 22 is slotted as shown in dotted lines in Fig. 2 to receive a horizontally arranged rib projection 24 formed on casing 1 to provide against rotation of said nut. Shaft 23 is rotatably mounted within an opening in the front wall 9 of casing 1 and an opening in a bearing plate 25 on the rear face of said wall. Said shaft is provided with a shoulder 26 which engages the rear face of plate 25 to prevent forward endwise displacement of said shaft. The forward end of shaft 23 has an adjusting knob 27 secured thereto by a screw 28 (Figs. 7 and 8). The rear face of said knob is formed to provide a groove 29 and a projection or tooth 30, located in a radial plane between the adjacent ends of said groove, the respective end walls of groove 29 being adapted to cooperate with a floating stop 31 to limit rotation of said knob in opposite directions. The tooth 30 is adapted to cooperate with means associated with a rotatable indicating dial 32 to effect a given rotary movement thereof, as will be more fully described hereinafter.

The outer face of the front wall 9 of casing 1 is provided with a relatively large cylindrical recess 33 of substantial depth, said recess being arranged concentrically with respect to the opening for shaft 23. The shaft 23 extends outwardly from the bottom wall of recess 33, and the stop 31, comprising a ring-shaped punched sheet metal member having an outwardly extending projection 34 arranged at a right angle thereto, is rotatably mounted on said shaft, adjacent to the bottom wall of said recess.

The projection 34 on stop 31 extends into the aforementioned groove 29 in the knob 27, the ends of which groove are located adjacent to the opposite sides of the tooth 30. As shown in Figs. 4 and 6, rotation of the knob 27 is limited in opposite directions by engagement of the respective ends of the groove 29 with the projection 34, and by engagement of the latter with opposite sides of the head of a screw 35 which is threaded into an opening in the bottom wall of recess 33. Thus when the adjusting knob 27 is in the position shown in Fig. 1 the projection 34 (Figs. 4 to 8) will engage the right-hand side of the head of screw 35, and one end wall of groove 29 will engage the right-hand side of projection 34, as shown in Fig. 4. Upon clockwise rotation of the knob 27 through an angle of at least 300 degrees the other end wall of groove 29 will engage the left-hand side of projection 34, as shown in Fig. 5. Continued clockwise rotation of said knob through an angle of at least 300 degrees will rotate the stop 31 until the projection 34 engages the left-hand side of the head of screw 35, as shown in Fig. 6.

Shaft 23 is provided near its forward end with an annular shoulder 36 having adjacent thereto a vertically milled or knurled portion 36ª. A washer 37 is driven or pressed onto the milled portion 36ª to seat against said shoulder 36, whereby said parts are restrained against axial and rotary movement relatively to each other. Washer 37 thus acts to prevent substantial outward displacement of member 31 while permitting rotation of shaft 23 with respect thereto. A lock washer 38 of well-known form surrounds the forward end portion 39 of shaft 23 and is clamped between the inner face of the adjusting knob 27 and the outer face of the washer 37 upon tightening of the screw 28. The end portion 39 of shaft 23 is of relatively smaller diameter than the milled portion 36ª and extends into a cylindrical recess 40 located centrally of the inner face of the adjusting knob 27. A cylindrical recess 40ª in the outer face of the knob 27 accommodates the head of the screw 28, and said recess is adapted to be closed by a plate 41 having a press fit within the slightly enlarged and shouldered outer end of said recess 40ª. While I have shown plate 41 as being composed of metal, it is to be understood that a disk or plate formed of celluloid or other insulating material might be employed if desired.

The indicating dial 32 is mounted within the recess 33 and is retained therein by a cover plate 42 which is secured to the front wall of the casing 1 by the screws 43, the shanks of which take into tapped recesses provided in said casing wall. Said indicating dial comprises a relatively thin, flat, punched sheet metal ring having numerals etched or otherwise marked on one face thereof. The cover plate 42 is provided with a relatively large circular opening 44 to provide clearance for the knob 27 and said plate is also provided with a number of smaller circular openings 45 spaced equidistantly from each other around the opening 44 in a circle which is concentric with said opening 44. There are ten openings 45 in the illustrated embodiment and they are spaced 36 degrees apart. The aforementioned numerals on the dial 32 are spaced 18 degrees apart (with the exception of numerals 8, 9 and 10, 11, which are spaced 36 degrees apart), so that in one position of the dial one set or consecutive series of numerals is visible through the openings 45 and upon rotation of said dial through an angle of 18 degrees another set or consecutive series of numerals is visible through said openings.

The numerals 1 to 9, inclusive, on the dial 32 comprise one set or consecutive series and are arranged alternately with respect to the numerals 10 to 18, inclusive, which comprise the other set or consecutive series. As shown in Figs. 1 and 3 to 7, the numerals in each set are arranged at an angle to the numerals in the other set, the angle in this case being 18 degrees, so that the numerals in the set which is visible through the openings 45 will appear in vertical position.

Rotary movement of the dial 32 is adapted to be effected by cooperative engagement of the tooth 30 on knob 27 with a punched sheet metal lever 46 which is pivotally attached to and supported by said dial as by means of a rivet 47. As just stated lever 46 is riveted to the dial in such a manner as to permit free oscillation or rotation of the former with respect to the latter, and said lever is provided with a notch 48 which accommodates the tooth 30 formed on knob 27. Opposite the notch 48 on lever 46 is a pivot projection 49 which is arranged to seat within a recess 50 which is radially offset from and communicates with the cylindrical recess 33. Thus upon clockwise rotation of the knob 27 from the position shown in Fig. 1 to the position shown in Fig. 3 the tooth 30 will engage the right-hand side wall of the notch 48, and upon continued clockwise rotation of said knob lever 46 will be rotated about its pivot projection 49. The dial 32, being pivotally secured to the lever 46 is rotated through an angle of 18 degrees to bring the set of numerals 10 to 18 into view. When the knob 27 is rotated in a counter-clockwise direction from the position thereof illustrated in Fig. 3 tooth 30 will engage the left-hand side wall of the notch 48 in lever 46 to effect counter-clockwise rotation of the dial 32 through an angle of 18 degrees to expose the set of numerals 1 to 9.

The dial 32 is held against the inner face of the cover plate 42 by a spring washer 51. Said washer comprises a relatively thin punched ring of a resilient sheet metal, such as phosphor bronze, said ring being formed in such a manner that opposite points on its circumference rest on the bottom wall of the recess 33 and opposite surfaces at right angles to said points engage the inner face of said dial. Said dial is provided on its outer surface with a small cone-shaped boss or projection 52 which is adapted to engage in each of its aforementioned positions one or the other of the respective depressions 53 and 54 formed on the inner face of the cover plate 42 to assist in preventing rotary displacement of said dial by vibration and to prevent consequent displacement of the lever 46 from the respective positions thereof required for cooperation with the projection 30 on the knob 27.

It is apparent that the aforedescribed device will provide for accurate indication of the position of a rotary adjusting element which is adapted to be moved through a range greater than one cycle; also that the same affords a practical arrangement adaptable to any use wherein it may be desirable to provide a different set of indicating characters for each revolution of a rotatable adjusting or indicating element.

What I claim as new and desire to secure by Letters Patent is:

1. In an indicating device, the combination with a dial having a plurality of sets of characters arranged thereon, of a rotatable pointer for selectively registering with the respective individual characters comprising each of said sets, means to provide for rendering said sets of characters visible individually, and means operable upon given movements of said pointer to definitely control the sequence in which said sets of characters are rendered visible.

2. In an indicating device, the combination with a dial having a plurality of sets of characters arranged thereon, of a rotatable pointer for selectively cooperating with the characters comprising each of said sets, means to provide for rendering said sets of characters visible individually, and means operable upon a given rotary movement of said pointer to effect a predetermined movement of said dial whereby said sets of characters are rendered visible in a predetermined sequence.

3. In an indicating device, the combination with a dial having a plurality of sets of characters superimposed thereon, the characters of said sets being arranged in alternate relation, of a rotatable pointer for selectively indicating the characters comprising each of said sets, means to provide for rendering said sets of characters visible individually, and means operable upon a given rotary movement of said pointer to effect a predetermined rotary movement of said dial whereby said sets of characters are rendered visible successively.

4. In an indicating device for indicating the setting of a rotary adjusting mechanism, the combination with a dial having at least two sets of characters carried thereby, the characters of said sets being arranged in alternate relation, of a rotatable manual adjusting element having a pointer for selectively indicating the characters comprising each of said sets, a cover member associated with said dial and having spaced openings therein arranged to reveal only one of said sets of characters at a time, and associated means operable upon a given degree of rotary movement of said adjusting element to effect a given degree of rotary movement of said dial whereby said sets of characters are revealed in succession through the openings in said cover member.

5. In an indicating device for indicating the setting of a rotary adjusting mechanism having a range of adjustment greater than one revolution, the combination with a dial having at least two sets of characters formed thereon, the characters of said sets being arranged in alternate relation, of a rotatable manual adjusting element having a pointer for selectively cooperating with the characters comprising each of said sets, a cover member associated with said dial and having spaced openings therein arranged to reveal only one of said sets of characters at a time, means operable upon a given degree of rotary movement of said adjusting element to effect a given degree of rotary movement of said dial whereby said sets of characters are revealed in succession through the openings in said cover member, and means associated with said adjusting element to limit the latter against movement thereof in opposite directions beyond indication by said pointer of the first character of the first set and the last character of the last set.

6. In a refrigerator control device, in combination, a loading spring having a predetermined range of adjustment, a rotatable adjusting mechanism requiring a degree of operation greater than one revolution to correspond with the complete range of adjustment of said spring, a manual adjusting element associated with said mechanism, an indicating device comprising a rotatable dial having at least two sets of characters carried on one surface thereof, the characters of said sets being arranged in alternate relation, said adjusting element having a pointer to provide for selectively cooperating with the characters comprising the respective sets, a cover member associated with said dial and having spaced openings formed therein and arranged to reveal only one of said sets of characters at a time, and means associated with said adjusting element and said dial, said means being adapted to cooperate upon a given rotary movement of said element to effect a predetermined degree of rotary movement of said dial whereby one set of characters is rendered visible through the openings in said cover member and the previously visible set of characters is concealed by said cover member.

7. In a refrigerator control device, in combination, a loading spring having a predetermined range of adjustment, a rotatable adjusting mechanism requiring a degree of operation greater than one revolution to correspond with the complete range of adjustment of said spring, a manual adjusting element for said mechanism, an indicating device comprising a rotatable dial having at least two sets of characters carried on one surface thereof, the characters of said sets being arranged in alternate relation, said adjusting element having a pointer arranged to selectively cooperate with the characters comprising the respective sets, a cover member associated with said dial and having spaced openings formed therein and arranged to reveal only one of said sets of characters at a time, means associated with said adjusting element and said dial, said means being adapted upon a given degree of rotary movement of said element in one direction to effect a predetermined degree of rotary movement of said dial in a like direction, whereby the other of said sets of characters is rendered visible through the openings in said cover member and the previously visible set of characters is concealed by said cover member, and said means being also adapted upon a given degree of rotary movement of said element in the reverse direction to effect movement of the dial in the reverse direction to its first mentioned position, to thereby provide for accurate indication of the degree of adjustment of said element in each and all positions thereof throughout its range.

8. In an indicating device for indicating the setting of a rotary adjusting mechanism having a range of adjustment greater than one revolution, the combination with a circular dial having a plurality of sets of characters carried on one surface thereof, of a rotatable adjusting element arranged in concentric relation to said dial and having a pointer to provide for selectively cooperating with the characters comprising each of said sets, means associated with said dial and arranged to reveal only one of said sets of characters at a time, and means operable upon a given degree of rotary movement of said adjusting element to effect a given degree of rotary movement of said dial whereby said sets of characters are revealed in succession.

9. In an indicating device of the character described, in combination, a rotatable adjusting element requiring rotation through an angle greater than 360 degrees, means for accurately indicating the relative position of said adjusting element at any point in its range, said means comprising a rotatable dial and means interposed between said adjusting element and said dial to effect a shifting movement of the latter upon a given degree of rotary movement of the former, and means comprising a fixed perforated plate to cooperate with said dial in any of the positions to which it may be shifted.

10. In a device of the character described for indicating the setting of the range adjusting mechanism of a refrigerator control device, said mechanism having a range of adjustment greater than one revolution, the combination with a rotatable dial having at least two sets of characters carried on one surface thereof, of a rotatable manual adjusting element arranged in concentric relation to said dial and having a pointer for selectively cooperating with the characters comprising each of said sets, a fixed member overlying said dial in concentric relation thereto and having spaced openings formed therein, said openings being arranged to reveal only one of said sets of characters at a time, means comprising a projection carried by said adjusting element and a notched lever pivotally mounted on said dial, said projection being adapted upon a given degree of rotary movement of said adjusting element to engage said notched lever to effect a predetermined degree of rotary movement of said dial whereby one of said sets of characters is rendered visible through the openings in said fixed member and the previously visible set of characters is concealed by said fixed member.

11. In a device of the character described for indicating the setting of a rotary adjusting mechanism having a range of adjustment greater than one revolution, the combination with a circular rotatable dial having at least two sets of characters carried on one surface thereof, of a rotatable adjusting element arranged in concentric relation to said dial and having a pointer to selectively cooperate with the characters comprising each of said sets, a fixed member overlying said dial and having spaced openings formed therein and arranged to reveal only one of said sets of characters at a time, means operable upon a given degree of rotary movement of said adjusting element in one direction to effect a predetermined degree of rotary movement of said dial in a like direction whereby the previously concealed set of characters is rendered visible through the openings in said fixed member and the previously visible set of characters is concealed by said fixed member, said means being also adapted upon a given degree of movement of said element in the reverse direction to effect movement of the dial in the reverse direction whereby the order of concealment and visibility of said sets of characters is reversed, to thereby provide for accurate indication of the degree of adjustment of said element in each and all positions throughout its range, and yieldable detent means associated with said dial and said fixed member to retain the former in each position to which it is moved pending movement thereof out of such position.

12. In a device of the character described, in combination, a pressure adjusting device including a coiled compression spring, a rotatable spindle for varying the degree of compression of said spring, said spindle requiring more than one complete turn thereof to provide a predetermined range of adjustment of said spring, a manual adjusting knob associated with said spindle, a dial having a plurality of sets of characters arranged on one surface thereof, a pointer carried by said knob for selectively registering with the characters comprising the respective sets, means to provide for rendering said sets of characters visible individually, and means operable upon a given degree of rotary movement of said knob to effect a predetermined rotary movement of said dial, whereby said sets of characters are rendered visible in a predetermined sequence.

13. In an indicating device, the combination with a dial having a plurality of sets of numbers arranged on one surface thereof, the numbers comprising each set being arranged in numerical sequence with respect to each other and in alternate relation with respect to the numbers comprising each of the other sets, of a rotatable pointer having a range of operation greater than one revolution, said pointer being arranged to selectively register with the numbers comprising the respective sets, means to provide for rendering said sets of numbers visible individually, and means operable upon a given rotary movement of said pointer to effect a predetermined movement of said dial, whereby said sets of numbers are rendered visible in a predetermined sequence, to thereby provide for accurate indication of the degree of adjustment of said pointer in each and all positions throughout its range.

CLYDE F. ROBBINS.